F. POTTER.
AUTOMATIC DISENGAGING MOTOR PLOW.
APPLICATION FILED NOV. 24, 1914.
1,159,268.
Patented Nov. 2, 1915.
2 SHEETS—SHEET 1.
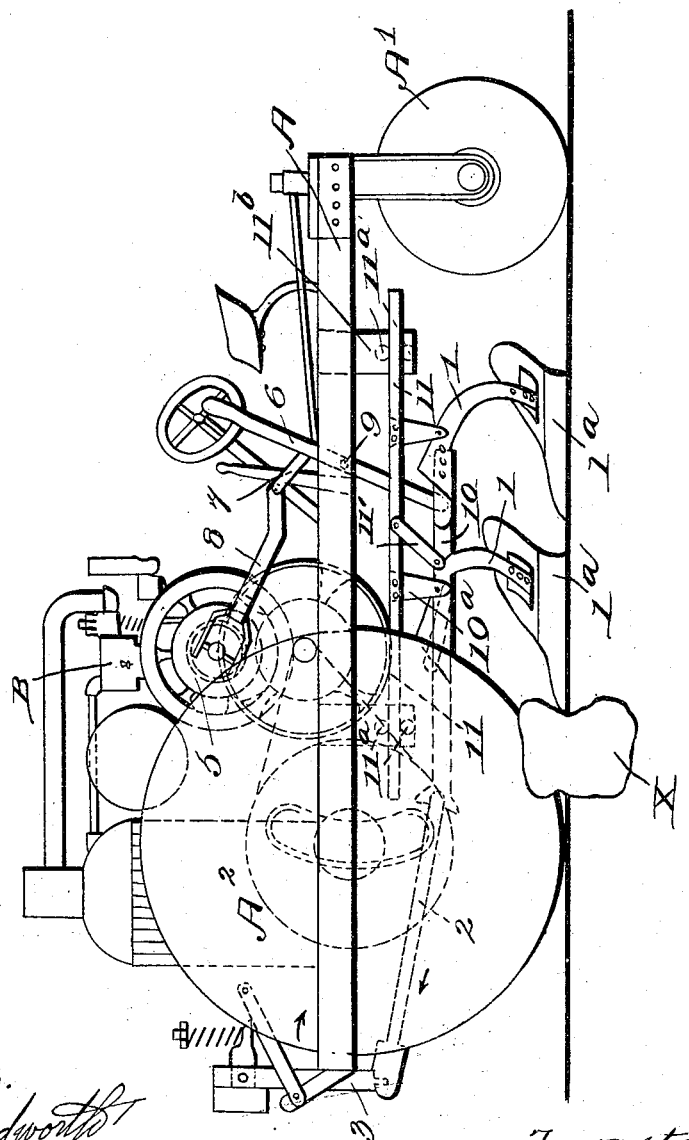

F. POTTER.
AUTOMATIC DISENGAGING MOTOR PLOW.
APPLICATION FILED NOV. 24, 1914.
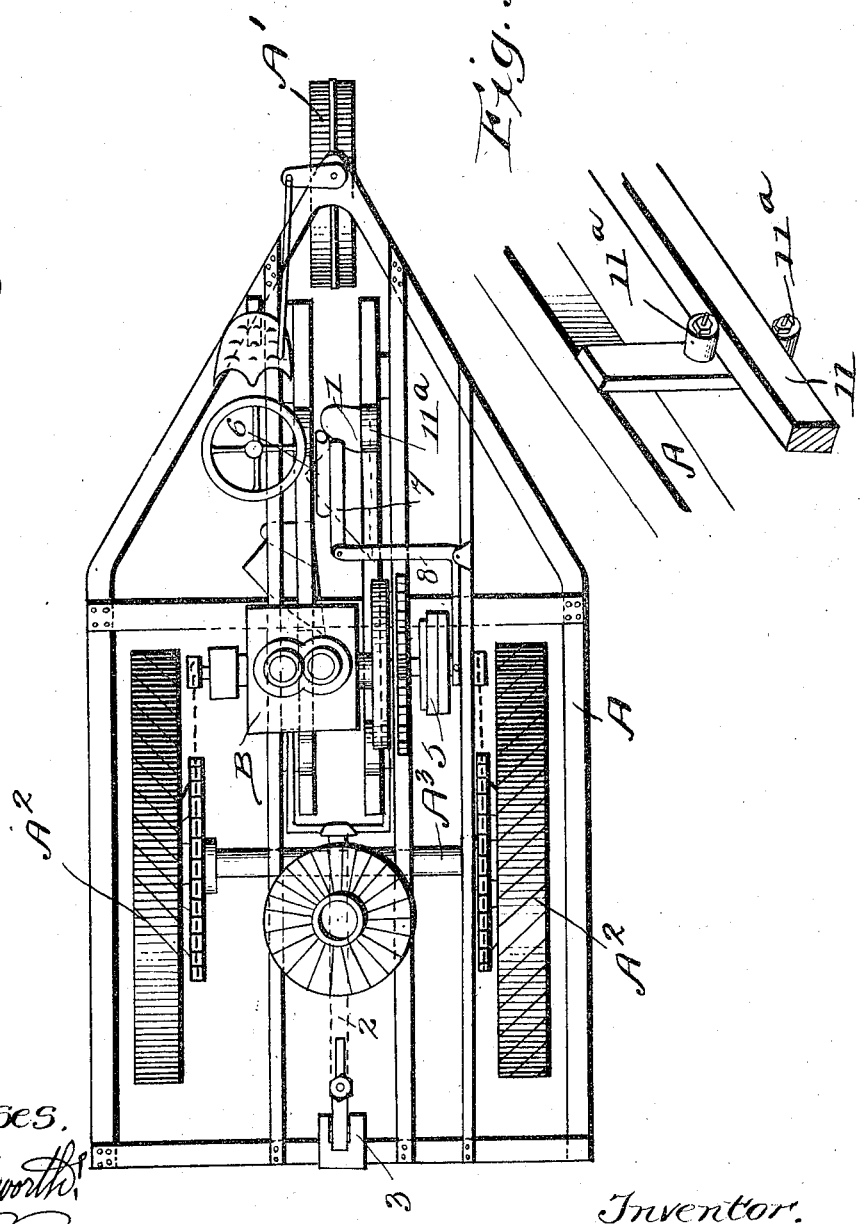

UNITED STATES PATENT OFFICE.

FRANK POTTER, OF CARTHAGE, MISSOURI.

AUTOMATIC-DISENGAGING MOTOR-PLOW.

1,159,268.

Specification of Letters Patent.

Patented Nov. 2, 1915.

Application filed November 24, 1914. Serial No. 873,743.

*To all whom it may concern:*

Be it known that I, FRANK POTTER, a citizen of the United States, and residing at Route 2, Carthage, in the county of Jasper and State of Missouri, have invented certain new and useful Improvements in Automatic-Disengaging Motor-Plows, of which the following is a specification.

This invention relates to improvements in plows and the leading object of the invention is to provide a plow with means adapted to elevate the plow shovel when an obstruction is engaged.

Another object of the invention is the provision of a plow with means for supporting the plow shovel, which is adapted to move upwardly to elevate the plow when an obstruction is engaged, and a trip for elevating the means.

With the above and other objects in view the invention comprises certain new and useful constructions, combinations, and arrangements of parts, clearly described in the following specification and fully illustrated in the accompanying drawings, in which:—

Figure 1 is a side elevation of a plow construction provided with the improvements. Fig. 2 is a top plan view thereof. Fig. 3 is a detail perspective view of a runner bar and roller guides therefor.

Referring to the accompanying drawings illustrating the practical application of the invention 1 designates the front and rear plow standards, which carry the plow shovels 1ª. The standards 1 are secured to the plow beam 10, which is connected to pendant brackets 10ª secured to the runner bar 11. The standards 1 have a pivotal connection with the brackets 10ª, and at least one of said standards is provided with a plurality of bolt holes whereby the same may be adjustably connected with the beams 10.

The runner bar 11 works on lateral guide rollers 11ª, which are arranged on the pendant brackets 11ᵇ, which have their upper ends rigidly secured to the frame beam A. A link 11' is pivotally connected at its upper end to the runner bar 11 and at its lower end to the beam 10.

The frame beam A is provided at its rear end with a supporting wheel A¹, and its forward end is supported by wheels A², mounted on an axle A³. A suitable motor or engine B is mounted upon the frame A, and a suitable transmission gear, of the planetary type, as indicated at 5 is provided for transmitting motion from the motor or engine to the wheels A². The gear 5 is provided with a reverse mechanism and a clutch. An arm 8 is connected at its forward end to this reversing mechanism and clutch, and at its rear end it is connected with the operating lever 6 by means of the arm 7. The lever 6 is pivoted to the frame A at 9 and projects downwardly and has an operating connection with the plow beam 10. The plow beam 10 is connected at its forward end with a supplemental beam 2, by a flexible joint, and this supplemental beam is flexibly connected to the spring trip, indicated at 3, which is mounted on the forward end of the frame A.

The spring trip is of such construction that an unusually obstinate obstruction is required to operate it in its first movement, and after being started in operation works more easily. When the plow shovels strike an obstruction the engagement tends to cause a forward movement of the beam 10, to which the shovels are connected. If the obstruction resists further movement of the plow shovels the spring trip will be released and the beam 10 is then permitted to move rearwardly, carrying the runner bar 11 with it, and as the lever 6 is connected with said beam 10 and pivotally secured to the frame beam A as at 9, the upper end of said lever is also forced in a forwardly direction, thus forcing the clutch out of engagement with the gear 5, through the medium of the arms 7 and 8, thus permitting the engine to operate freely while the machine in general is brought to a standstill.

Suitable means may be provided for elevating the plow shovels. The engine may be reversed so as to drive the motor plow rearwardly.

The form of spring trip used is identical with that shown in the catalogues of the Oliver Chilled Plow Works, and which is applied to my improved plow construction in the manner disclosed in the drawings, for preventing the destruction of the plow shovels, under the impact of an obstruction.

Having described my invention I claim:—

In combination with a plow of a frame having a series of brackets secured thereto, a plurality of rollers mounted thereon, a runner bar supported by said rollers, a plow beam supported by said runner bar and having a plurality of plow shovels secured thereto, a motor mounted upon the said frame, a clutch coöperating therewith, a lever having connection with said clutch and plow beam, a supplemental beam connected at one end thereof to said plow beam and a spring trip engaging the opposite end of said supplemental beam as a means for normally holding the plow shovels in operative position.

FRANK POTTER.

Witnesses:
B. H. ESTERLY,
LAURA HOBBS.